US008064973B2

(12) United States Patent
Vesamäki et al.

(10) Patent No.: US 8,064,973 B2
(45) Date of Patent: Nov. 22, 2011

(54) ELECTRONIC DEVICE WITH INTEGRATED SLIDE

(75) Inventors: Seppo Vesamäki, Kangasala (FI); Timo Herranen, Viiala (FI)

(73) Assignee: Nokia Corporation, Espoo (FI)

( * ) Notice: Subject to any disclaimer, the term of this patent is extended or adjusted under 35 U.S.C. 154(b) by 876 days.

(21) Appl. No.: 12/004,557

(22) Filed: Dec. 20, 2007

(65) Prior Publication Data

US 2009/0163257 A1 Jun. 25, 2009

(51) Int. Cl.
*H04M 1/00* (2006.01)
(52) U.S. Cl. ............. 455/575.4; 455/575.1; 361/679.02; 361/679.39
(58) Field of Classification Search ............... 455/575.4; 361/679.1–679.61
See application file for complete search history.

(56) References Cited

U.S. PATENT DOCUMENTS

| | | | |
|---|---|---|---|
| 6,822,871 B2 * | 11/2004 | Lee et al. ..................... 361/727 |
| 7,269,449 B2 * | 9/2007 | Salminen et al. .......... 455/575.1 |
| D559,222 S * | 1/2008 | Chen .................... D14/138 AA |
| 7,539,011 B2 * | 5/2009 | Shih et al. ................ 361/679.26 |
| 7,580,726 B2 * | 8/2009 | Maatta et al. ............. 455/550.1 |
| 7,636,591 B2 * | 12/2009 | Kim et al. ................ 455/575.4 |
| 7,656,662 B2 * | 2/2010 | Chen ........................ 361/679.55 |
| 7,674,120 B2 * | 3/2010 | Morganstern et al. ........ 439/131 |
| 2005/0052837 A1 * | 3/2005 | Kota et al. ..................... 361/683 |
| 2005/0128686 A1 * | 6/2005 | Pihlaja et al. ................. 361/679 |
| 2005/0245251 A1 * | 11/2005 | Lee et al. ..................... 455/422.1 |
| 2005/0282597 A1 | 12/2005 | Park et al. .................. 455/575.4 |
| 2006/0056141 A1 * | 3/2006 | Pihlaja et al. ................. 361/683 |
| 2006/0079283 A1 | 4/2006 | Kim et al. ..................... 455/558 |
| 2006/0104013 A1 * | 5/2006 | Sakakibara et al. ........... 361/680 |
| 2007/0076118 A1 | 4/2007 | Chiang ......................... 348/375 |
| 2007/0273786 A1 * | 11/2007 | Ahn et al. ..................... 348/373 |
| 2008/0051164 A1 * | 2/2008 | Joo et al. ..................... 455/575.4 |
| 2008/0070650 A1 * | 3/2008 | Kim et al. .................. 455/575.4 |
| 2008/0125200 A1 * | 5/2008 | Park et al. .................. 455/575.4 |
| 2008/0261659 A1 * | 10/2008 | Jang et al. ..................... 455/566 |
| 2009/0005135 A1 * | 1/2009 | Lindgren et al. ........... 455/575.4 |
| 2009/0029741 A1 * | 1/2009 | Satou et al. ..................... 455/566 |
| 2009/0029746 A1 * | 1/2009 | Yanagihashi et al. ...... 455/575.3 |
| 2009/0163257 A1 * | 6/2009 | Vesamaki et al. .......... 455/575.4 |
| 2009/0215507 A1 * | 8/2009 | Park ........................... 455/575.4 |
| 2010/0129010 A1 * | 5/2010 | Jo ..................................... 384/10 |

FOREIGN PATENT DOCUMENTS

| | | | |
|---|---|---|---|
| EP | 1 770 965 A1 | | 4/2007 |
| EP | 1 860 710 A1 | | 11/2007 |
| WO | WO-03/019909 A2 | | 3/2003 |
| WO | WO 2007099638 A1 | * | 9/2007 |
| WO | WO 2008/069317 A1 | | 6/2008 |

* cited by examiner

*Primary Examiner* — Kent Chang
*Assistant Examiner* — Magdi Elhag
(74) *Attorney, Agent, or Firm* — Harrington & Smith

(57) ABSTRACT

Disclosed herein is an apparatus. The apparatus includes a first housing section, electronic circuitry, and a second housing section. The first housing section forms a front face and a first side of the apparatus. The electronic circuitry is mounted in the first housing section. The second housing section is movably connected to the first housing section. The second housing section is configured to be movable between a first position and a second position. The second housing section partially houses components from the first housing section when the second housing section is in the first position. The second housing section forms a majority of a back face of the apparatus when the second housing section is in the first position.

23 Claims, 6 Drawing Sheets

ELECTRONIC DEVICE WITH INTEGRATED SLIDE

BACKGROUND OF THE INVENTION

1. Field of the Invention

The invention relates to an electronic device and, more particularly, to an electronic device with an integrated slide.

2. Brief Description of Prior Developments

Electronic devices, such as mobile phones for example, have various types of opening mechanisms to achieve a small transport size and a large use size. Many of these devices include a housing having two halves (or housing sections) which are connected with fold or slide mechanisms for example. The configuration of these housing sections generally prohibits the use of components having high (or tall) profiles. The maximum component height is generally limited by the height of either half of the housing.

Patent Application Nos. WO 03/019909 A2 and EP 1770965 A1 disclose conventional configurations having a main housing section with one or more slidable keypad sections. As consumers demand increased functionality from electronic devices, there is a need to provide improved devices having increased capabilities while maintaining robust and reliable product configurations.

Accordingly, there is a desire to provide an improved housing configuration for an electronic device.

SUMMARY OF THE INVENTION

In accordance with one aspect of the invention, an apparatus is disclosed. The apparatus includes a first housing section, electronic circuitry, and a second housing section. The first housing section forms a front face and a first side of the apparatus. The electronic circuitry is mounted in the first housing section. The second housing section is movably connected to the first housing section. The second housing section is configured to be movable between a first position and a second position. The second housing section partially houses components from the first housing section when the second housing section is in the first position. The second housing section forms a majority of a back face of the apparatus when the second housing section is in the first position.

In accordance with another aspect of the invention, an apparatus is disclosed. The apparatus includes a housing and electronic circuitry. The housing includes a first housing section and a second housing section. The electronic circuitry is mounted in the housing. The second housing section is configured to be movable between a first position and a second position. The second housing section comprises an interior volume. A portion of the first housing section is within the interior volume when the second housing section is in the first position. A majority of the interior volume is an open volume free of components of the apparatus when the second housing section is in the second position.

In accordance with another aspect of the invention, a method is disclosed. A first housing section is provided. The first housing section forms a front face and a first side of an apparatus. Electronic circuitry is installed in the first housing section. A second housing section is movably connected to the first housing section. The second housing section is configured to be movable between a first position and a second position. The second housing section partially houses components from the first housing section when the second housing section is in the first position. The second housing section forms a majority of a back face of the apparatus when the second housing section is in the first position.

In accordance with another aspect of the invention, a method is disclosed. A housing is provided. The housing includes a first housing section. Electronic circuitry is installed in the housing. A second housing section is movably connected to the housing. The second housing section is configured to be movable between a first position and a second position. The second housing section includes an interior volume. A portion of the first housing section is within the interior volume when the second housing section is in the first position. A majority of the interior volume is an open volume free of components when the second housing section is in the second position.

BRIEF DESCRIPTION OF THE DRAWINGS

The foregoing aspects and other features of the invention are explained in the following description, taken in connection with the accompanying drawings, wherein.

DETAILED DESCRIPTION OF THE EXEMPLARY EMBODIMENT

Figure 1:
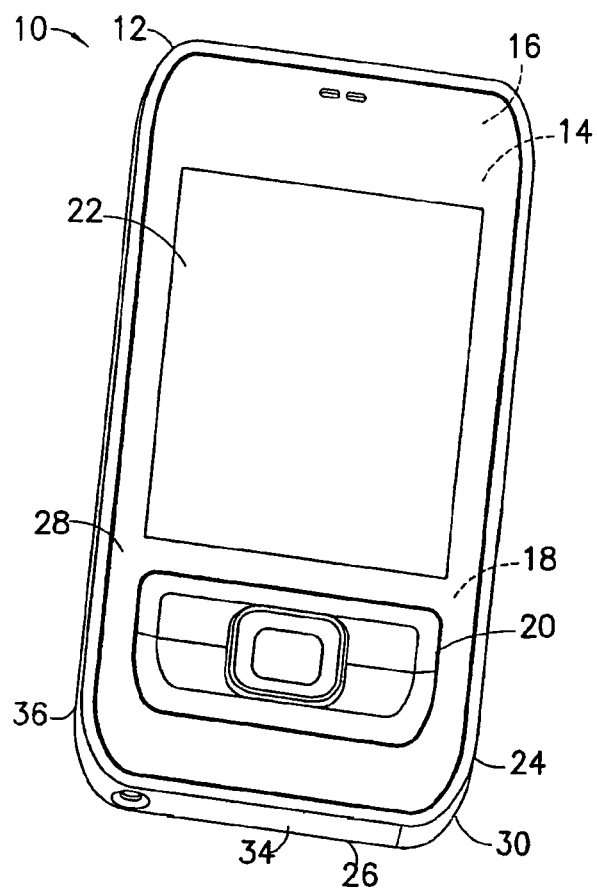
FIG. 1 is a perspective view illustrating a front face of an electronic device comprising features of the invention.

Referring to FIG. 1, there is shown a perspective view of an electronic device 10 incorporating features of the invention. Although the invention will be described with reference to the exemplary embodiment shown in the drawings, it should be understood that the invention can be embodied in many alternate forms of embodiments. In addition, any suitable size, shape or type of elements or materials could be used.

In this exemplary embodiment the device 10 is a multi-function portable electronic device. However, in alternate embodiments, features of the exemplary embodiment of this invention could be used in any suitable type of hand-held portable electronic device such as a mobile phone, a gaming device, a music player, or a PDA, for example. In addition, as is known in the art, the device 10 can include multiple features or applications such as a camera, a music player, a game player, or an Internet browser, for example. The device 10 generally comprises a housing 12, a transceiver 14 connected to an antenna 16, electronic circuitry 18, such as a controller and a memory for example, within the housing 12, a user input region 20 and a display 22. The display 22 could also form a user input section, such as a touch screen. The housing 12 includes a first housing section 24 and a second housing section 26. It should be noted that in alternate embodiments, more than two housing sections could be provided. Additionally, in alternate embodiments, the device 10 can have any suitable type of features as known in the art.

Figure 2:
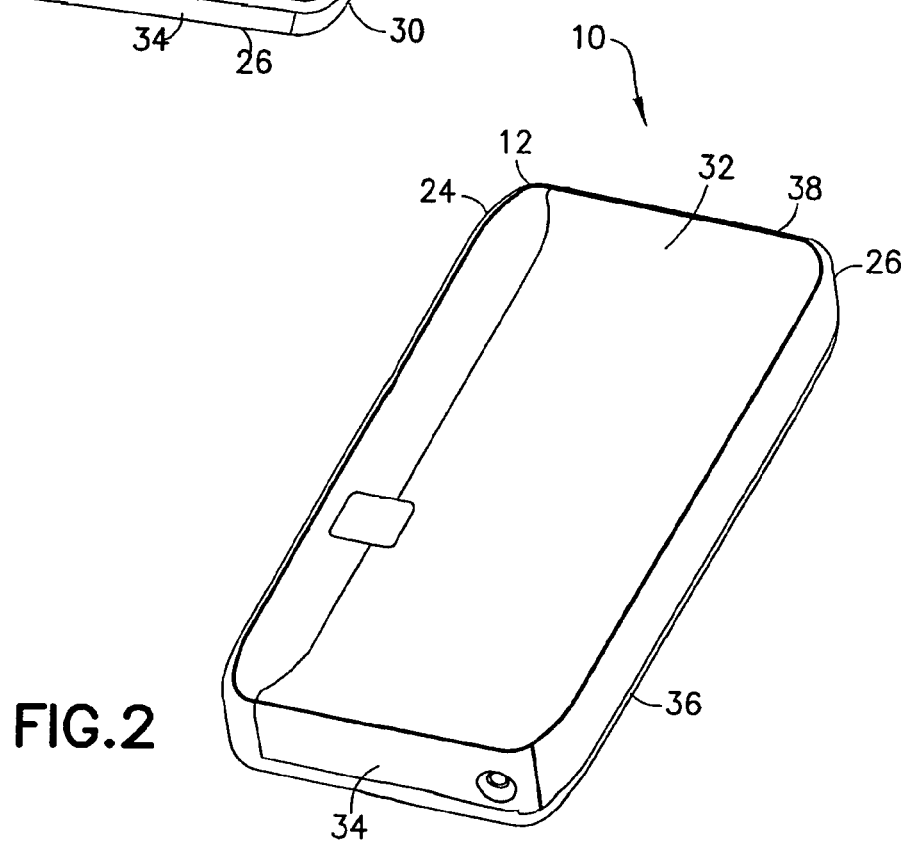
FIG. 2 is a perspective view illustrating a back face of the electronic device shown in FIG. 1.
Figure 3:
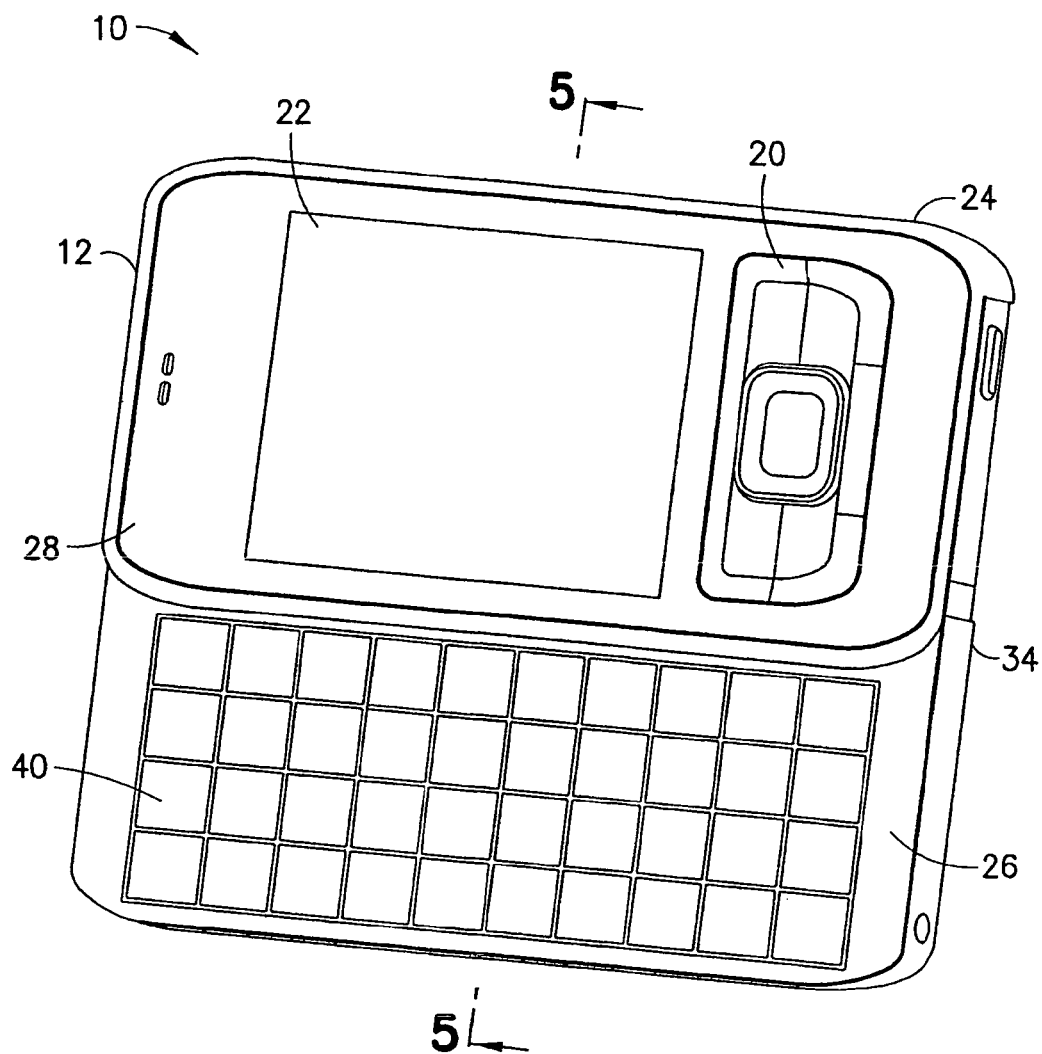
FIG. 3 is a perspective view illustrating a front face of the electronic device shown in FIG. 1 in an open position.
Figure 4:
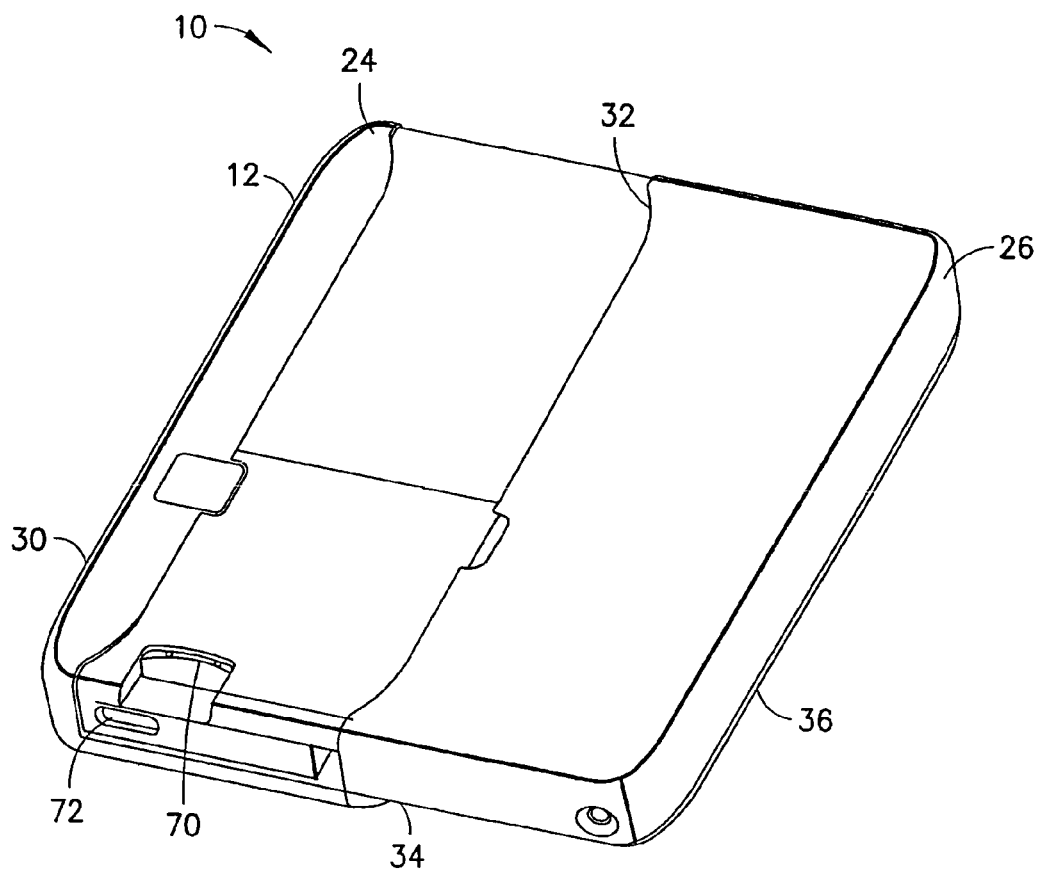
FIG. 4 is a perspective view illustrating a rear face of the electronic device shown in FIG. 3.
Figure 5:
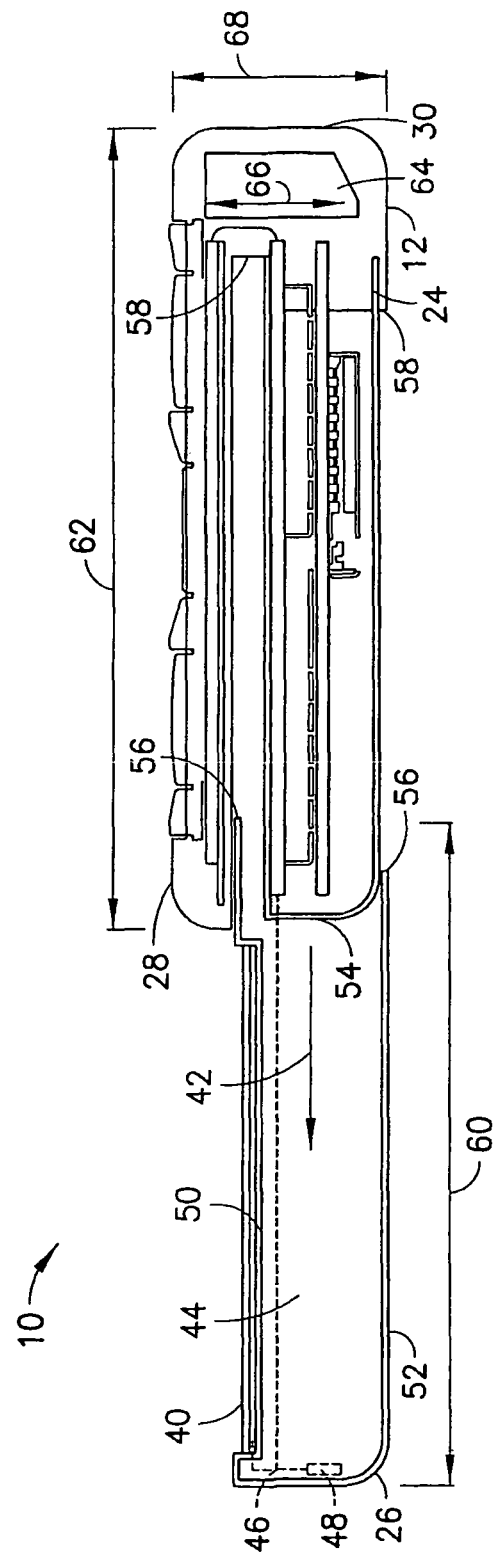
FIG. 5 is cross section view of the electronic device shown in FIG. 3 taken along line 5-5.

The second housing section 26 is movably connected to the first housing section 24. More specifically, the second housing section 26 is slidably connected to the first housing section 24 between a closed position as shown in FIGS. 1 and 2, and an open position as shown in FIGS. 3-5. The device 10 may comprise a telescopic type of sliding mechanism between the first housing section 24 and the second housing section 26. However, any suitable type of sliding mechanism may be provided.

The first housing section 24 forms a front face 28 and a first side 30 of the electronic device 10 (and the housing 12). Additionally, the first housing section 24 forms portions of a back face 32, a second side 34, a third side 36, and a fourth side 38 of the electronic device 10 (and the housing 12).

In this embodiment, the first housing section 24 comprises the first user input region 20 and the display 22 at the front face 28. The first user input region 20 may be any suitable type of user input region.

The second housing section 26 forms a majority of the back face 32, the second side 34, the third side 36, and the fourth side 38, of the electronic device 10 (and the housing 12) when the second housing section 26 is in the closed position. Additionally, the second housing section 26 forms portions of the back face 32, the second side 34, the third side 36, and the fourth side 38 of the electronic device 10 (and the housing 12) when the second housing section 26 is in the open position. More specifically, in this embodiment the second housing section 26 forms about half of the portions of the back face 32, the second side 34, the third side 36, and the fourth side 38 of the electronic device 10 (and the housing 12) when the second housing section 26 is in the open position.

The second housing section 26 comprises a second user input region 40. The second user input region 40 may be a keyboard or a keypad, for example. However, it should be noted that alternate embodiments may provide any suitable type of user input region. The second user input region 40 is visible and accessible when the device 10 is in the open position shown in FIGS. 3-5.

It is to be noted that although the figures illustrate the first housing section 24 comprising the first user input region 20 and the display 22 and the second housing section 26 comprising the second user input region 40, alternate embodiments may comprise any suitable location for the user input regions and display. Additionally, more than one user input region and/or display may be provided.

The second housing section 26 is movably connected to the first housing section 24 such that from the closed position the second housing section 26 is configured to slide in a direction 42 away from the first side 30 of the device 10 as shown in FIG. 5.

The slidable connection (or the integrated slide connection) between the first housing section 24 and the second housing section 26 acts as a moving (or slidable) tube, which forms a base for the second user input region (keypad, touch pad etc.) 40, and forms a partial outer cover for the back face 32 of the device 10. When in the closed position, the second housing section 26 comprises an interior volume 44 which is used as a space for hardware components, a battery, audio components, and/or an interior cavity, for example. When the second housing section 26 is slid into the open position, the interior volume (or hollow space) 44 may also create a natural route for the electrical connection (which may be a tex flex, flat flexible cable (FFC), flexible printed circuit (FFC) cable, or any suitable cable/conductor for example) 46 for the second user input region 40 and other possible electrical components 48 moving with the second housing section 26. However, it should be noted that the electrical interconnection between the first housing section 24 and the second housing section 26 may be made by any suitable means.

The interior volume 44 is between a front portion 50 and a back portion 52 of the second housing section 26 (best shown in FIG. 5). When the second housing section 26 is in the closed position, a component housing portion 54 of the first housing section 24 is within the interior volume 44. When the second housing section 26 is moved to the open position, the front portion 50 and the back portion 52 of the second housing section 26 slide (in the direction 42) over the component housing portion 54 of the first housing section 24. This moves the interior volume 44 away from the component housing portion 54, and provides an open volume (substantially free of electronic components of the component housing portion 54 and/or the device 10) within the interior volume 44. To return the second housing section 26 to the closed position, the second housing section 26 is moved towards the first side 30 of the device 10 (a direction opposite to the direction 42). As the second housing section 26 is returned to the closed position, the front portion 50 and the back portion 52 slide over the component housing portion 54 such that the component housing portion 54 is housed within the interior volume 44 of the second housing section 26.

When the second housing section 26 is in the closed position, the open end 56 of the second housing section 26 is received at a receiving area 58 of the first housing section 24. The second housing section 26 comprises a width 60 (along the direction 42) that is less than an overall width 62 of the device 10. The smaller width 60 of the second housing section 26 allows for an interior space 64 (shown in FIG. 6) between the second housing section 26 and the first side 30 of the device 10.

The interior space 64 extends between the second side 34 and the fourth side 38 of the device 10. The interior space 64 comprises a height 66 which extends along a majority of a thickness 68 of the device 10. The height 66 of the interior space 64 allows for larger components (relative to the size of the components within the component housing portion 54) to be fitted within the housing 12.

The invention provides a second housing section, or slide section, 26 which forms part of the cover of the device 10 when the device 10 is closed (or in the closed position) and allows access to the keyboard 40 when the device 10 is being used in the open position. In this embodiment, the second housing section 26 slides over (when moving the second housing section from the open position to the closed position) the first housing section 24. This allows for the second housing section 26 to form part of the back face 32, the second side 34, the third side 36, and the fourth side 38, of the electronic device 10. However, it should be noted that alternate embodiments may provide a housing wherein portions of the second housing section slide under, or inside, (when moving the second housing section from the open position to the closed position) the first housing section. In one alternate embodiment for example, the second housing section may be configured to slide under the first housing section at the back face 32, and the sides 34 and 38. This would allow for the second housing section to form only a portion (or majority) of the third side 36 of the device 10 (when in the closed position). In other alternate embodiments for example, any suitable portions of the second housing section may be configured to slide inside the first housing section.

Conventional configurations have generally increased the device thickness (overall or locally) to accommodate electronic components having high (or tall) profiles. The invention provides a slide portion 26 that is hollow inside and does not include any part of device electronics (other than the keyboard 40).

One advantage of the invention is that the hollow space (interior volume 44) inside the slide section 26 can be used to hide the flex connection 46 of the keyboard 40. Additionally, the slide section 26 provides mechanical protection to the electrical connection 46, and keeps the mechanism clean and out of sight. The invention also provides the hollow space (interior volume 44) inside the slide section 26 which could be also used as a speaker cavity if desired. Furthermore, as the slide section 26 does not extend to the entire width 62 of the device 10, there is room in the device for components that require the full thickness of the device 10. In other words, the interior space 64 allows for components having heights/thicknesses approaching the thickness 68 of the device 10 to be installed within the housing 12. In this embodiment, the electronic circuitry 18 is mounted in the first housing section 24. This provides the hollow space within the second housing section 26 when the second housing section is in the open position. However, it should be noted that alternate embodiments may provide electronic circuitry and/or components to be mounted within the second housing section for example. This alternate embodiment would provide the hollow space within the first housing section when the second housing section is in the open position. In other alternate embodiments for example, the electronic circuitry and/or components may be mounted in both the first housing section and the second housing section. This other alternate embodiment would provide the hollow space to be partially within the first housing section and the second housing section accordingly.

Figure 6:
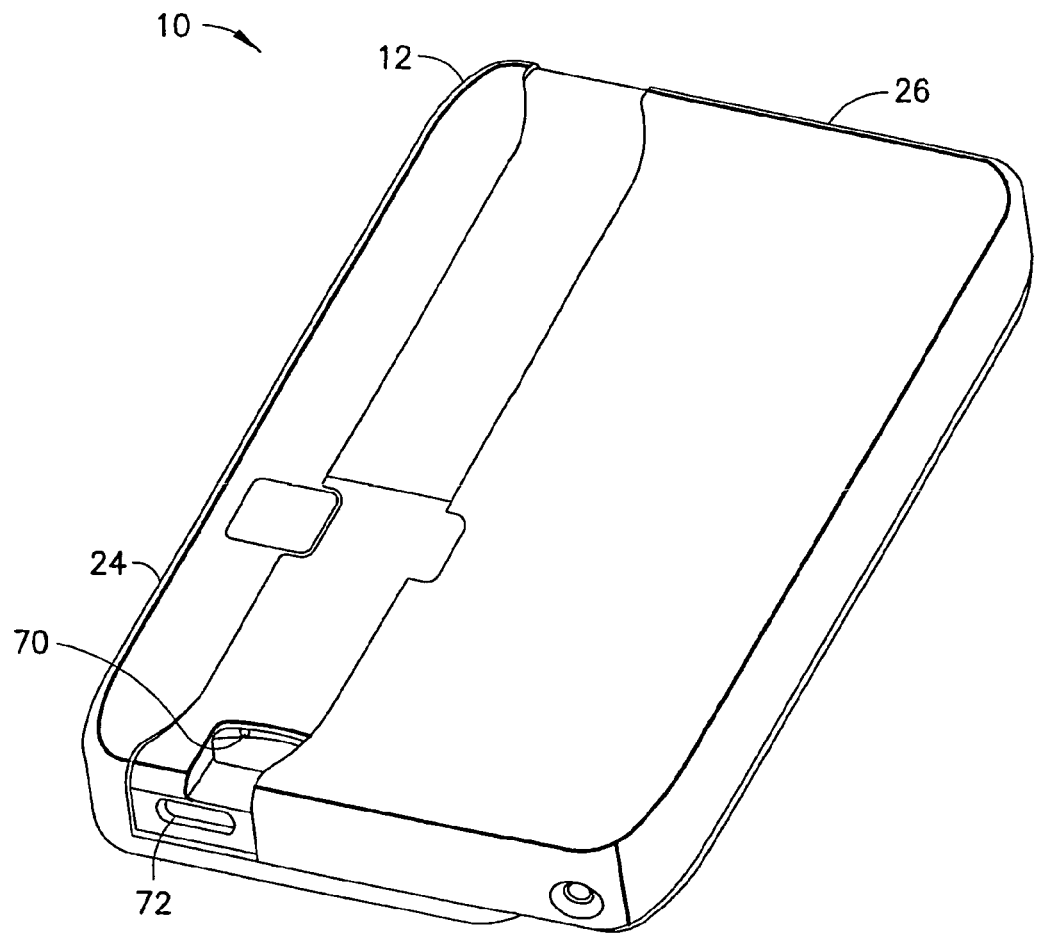
FIG. 6 is a perspective view illustrating the rear face of the electronic device shown in FIG. 1 in a partially open position.

The sliding section may also be used for covering electronic component interfaces of the device. The electronic component interfaces may be a card slot (such as memory card slot or a removable electronic module for example) 70 and an electrical connector interface 72 of the first housing section 24 when the slide section 26 is in the closed position. As illustrated in FIGS. 4 and 6, the card slot 70 and the connector interface 72 are protected when the section 26 is closed, and easily accessible when the section 26 is in the open position or in a partially open position (as shown in FIG. 6). Similar to the covering function for the card slot 70 and connector interface 72 described above, the sliding cover (or second housing section) 26 can be used for activating and/or covering a camera of the device disposed at the first housing section 24.

Figure 7:
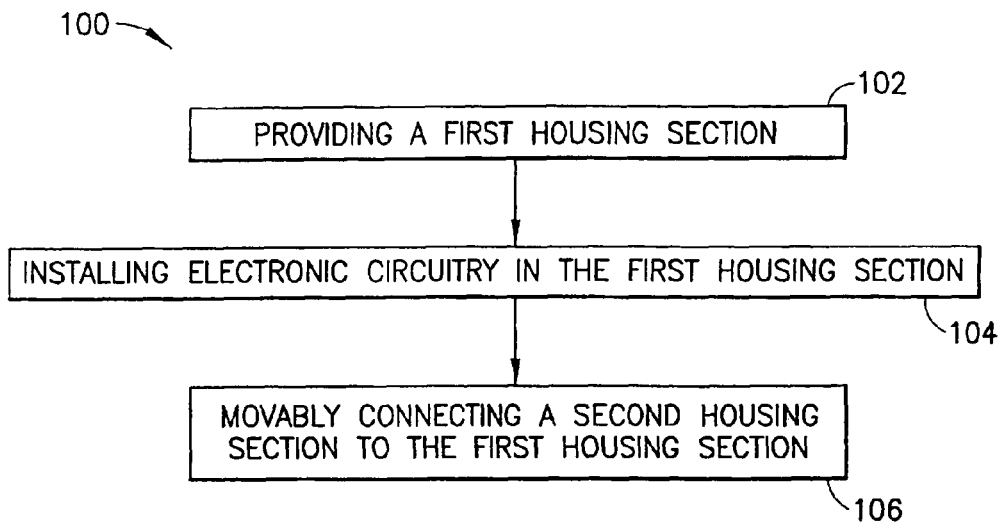
FIG. 7 is a block diagram of an exemplary method of manufacturing the electronic device shown in FIG. 1.

FIG. 7 illustrates a method 100 of manufacturing the device 10. The method 100 includes the following steps. Providing a first housing section 24 (step 102). The first housing section 24 forms a front face 28 and a first side 30 of the apparatus (device 10). Installing electronic circuitry 18 in the first housing section 24 (step 104). Movably connecting a second housing section 26 to the first housing section 24 (step 106). The second housing section 26 is configured to be movable between a first position and a second position. The second housing section 26 is configured to slide in a direction away from the first side 30 of the apparatus (device 10). The second housing section 26 partially houses components from the first housing section 24 when the second housing section 26 is in the first position. The second housing section 26 forms a majority of the back face 32 of the apparatus (device 10) when the second housing section 26 is in the first position. The second housing section 26 forms a portion of the back face 32 of the apparatus (device 10) when the second housing section 26 is in the second position. It should be noted that any of the above steps may be performed alone or in combination with one or more of the steps.

Figure 8:
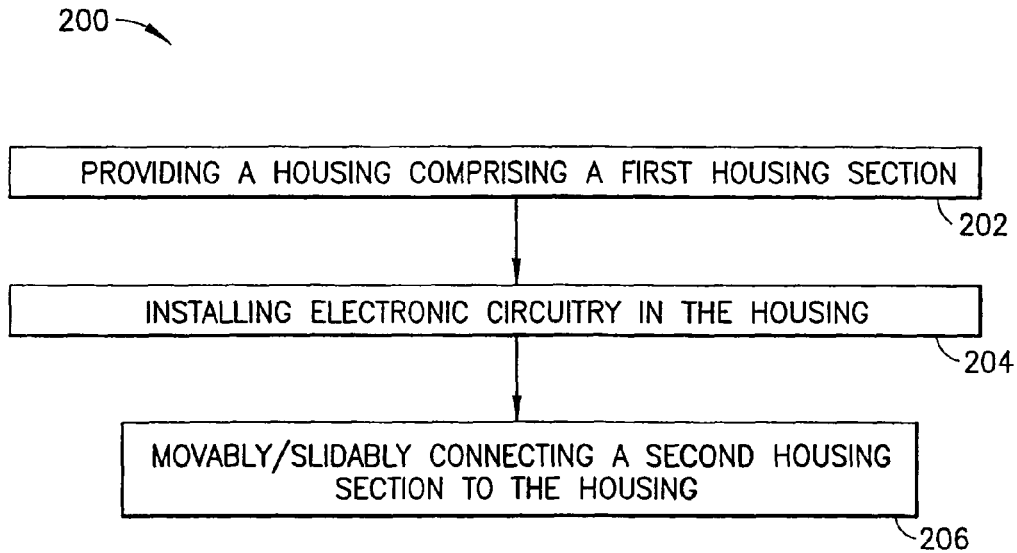
FIG. 8 is a block diagram of another exemplary method of manufacturing the electronic device shown in FIG. 1.

FIG. 8 illustrates a method 200 of manufacturing the device 10. The method 200 includes the following steps. Providing a housing 12 comprising a first housing section 24 (step 202). Installing electronic circuitry 18 in the housing 12 (step 204). Movably (slidably) connecting a second housing section 26 to the housing 12 (step 206). The second housing section 26 is configured to be movable between a first position and a second position. The second housing section 26 comprises an interior volume 44. A portion of the first housing section 24 is within the interior volume 44 when the second housing section 26 is in the first position. A majority of the interior volume 44 is an open volume free of components when the second housing section 26 is in the second position. The second housing section 26 is spaced from the first side 30 of the housing 12. It should be noted that any of the above steps may be performed alone or in combination with one or more of the steps.

It should be understood that the foregoing description is only illustrative of the invention. Various alternatives and modifications can be devised by those skilled in the art without departing from the invention. Accordingly, the invention is intended to embrace all such alternatives, modifications and variances which fall within the scope of the appended claims.

What is claimed is:

1. An apparatus comprising:
   a first housing section forming a front face and a first side of the apparatus;
   a second housing section movably connected to the first housing section, wherein:
   the second housing section is configured to be movable between a first position and a second position;
   the second housing section partially houses components from the first housing section when the second housing section is in the first position;
   the second housing section forms a majority of a back face of the apparatus when the second housing section is in the first position;
   the first housing section comprises a first back portion and the second housing section comprises a second back portion and the first back portion and second back portion are substantially flush with each other when the second housing section is in the second position; and
   the second housing section is spaced from the first side when the second housing section is in the first position and the second position.

2. The apparatus of claim 1 wherein the second housing section is configured to slide in a direction away from the first side of the apparatus when the second housing section is moved from the first position to the second position, wherein the second housing section comprises an interior volume, and wherein a majority of the interior volume is an open volume free of components of the apparatus when the second housing section is in the second position.

3. The apparatus of claim 1 wherein the second housing section forms a portion of the back face of the apparatus when the second housing section is in the second position.

4. The apparatus of claim 1 wherein an interior space between the second housing section and the first side of the first housing section comprises a height extending along a majority of a thickness of the apparatus.

5. The apparatus of claim 1 wherein the second housing section is slidably connected to the first housing section, wherein the apparatus further comprises electronic circuitry mounted in the first housing section, and wherein the apparatus is a mobile telephone.

6. The apparatus of claim 1 wherein the second housing section comprises a user input region, and wherein the user input region is accessible by a user when the second housing section is in the second position.

7. The apparatus of claim 1 wherein the first housing section comprises an electronic device component interface, wherein the second housing section covers the electronic device component interface when the second housing section is in the first position, and wherein the electronic device component interface is accessible when the second housing section is in the second position.

8. The apparatus of claim 7 wherein the electronic device component interface is configured to receive a removable electronic module or an electrical connector.

9. An apparatus comprising:
a housing comprising a first housing section comprising a first back portion and a second housing section comprising a second back portion,
wherein the second housing section is configured to be movable between a first position and a second position, wherein the second housing section comprises an interior volume, wherein a portion of the first housing section is within the interior volume when the second housing section is in the first position, wherein a majority of the interior volume is an open volume free of components of the apparatus when the second housing section is in the second position, and wherein the first back portion and the second back portion are substantially flush with each other when the second housing section is in the second position.

10. The apparatus of claim 9 wherein the second housing section is spaced from a first side of the housing.

11. The apparatus of claim 9 wherein the second housing section comprises a user input region, wherein an electrical conductor is connected between the user input region and the housing, and wherein the electrical conductor extends through at least a portion of the interior volume when the second housing section is in the second position.

12. The apparatus of claim 9 wherein the interior volume forms a speaker cavity of the apparatus when the second housing section is in the second position.

13. The apparatus of claim 9 wherein the second housing section is slidably connected to the first housing section.

14. The apparatus of claim 10, further comprising electronic circuitry mounted in the housing, and wherein the second housing section forms a majority of a back face of the apparatus when the second housing section is in the first position.

15. The apparatus of claim 9 wherein the second housing sections forms a memory card cover when the second housing section is in the first position.

16. The apparatus of claim 9 wherein the housing comprises an interior space adjacent to the interior volume, and wherein a height of the interior space extends along a majority of a thickness of the apparatus.

17. The apparatus of claim 9 wherein the first housing section forms a first side of the apparatus, and wherein the second housing section forms a majority another side of the apparatus, wherein the another side is opposite the first side.

18. A method comprising:
providing a first housing section comprising a first back portion, wherein the first housing section forms a front face and a first side of an apparatus;
movably connecting a second housing section, comprising a second back portion, to the first housing section, such that:
the second housing section is configured to be movable between a first position and a second position;
the second housing section partially houses components from the first housing section when the second housing section is in the first position;
the second housing section forms a majority of a back face of the apparatus when the second housing section is in the first position;
the first back portion and second back portion are substantially flush with each other when the second housing section is in the second position; and
the second housing section is spaced from the first side when the second housing section is in the first position and the second position.

19. The method of claim 18 further comprising installing electronic circuitry in the first housing section, and wherein the second housing section is configured to slide in a direction away from the first side of the apparatus.

20. The method of claim 18 wherein the second housing section forms a portion of the back face of the apparatus when the second housing section is in the second position.

21. A method comprising:
providing a housing comprising a first housing section, comprising a first back portion; and
movably connecting a second housing section, comprising a second back portion, to the housing, wherein the second housing section is configured to be movable between a first position and a second position, wherein the second housing section comprises an interior volume, wherein a portion of the first housing section is within the interior volume when the second housing section is in the first position, wherein a majority of the interior volume is an open volume free of components when the second housing section is in the second position, and wherein the first back portion and the second back portion are substantially flush with each other when the second housing section is in the second position.

22. The method of claim 21 further comprising installing electronic circuitry in the housing, and wherein the connecting of the second housing section to housing further comprises slidably connecting the second housing section to the housing.

23. The method of claim 21 wherein the second housing section is spaced from a first aide of the housing.

* * * * *

UNITED STATES PATENT AND TRADEMARK OFFICE
CERTIFICATE OF CORRECTION

PATENT NO. : 8,064,973 B2  
APPLICATION NO. : 12/004557  
DATED : November 22, 2011  
INVENTOR(S) : Vesamäki et al.

It is certified that error appears in the above-identified patent and that said Letters Patent is hereby corrected as shown below:

Claim 23, col. 8, line 53 delete "aide" and insert --side--.

Signed and Sealed this
Twentieth Day of March, 2012

David J. Kappos
*Director of the United States Patent and Trademark Office*